(12) United States Patent
Schreck

(10) Patent No.: US 7,050,614 B2
(45) Date of Patent: May 23, 2006

(54) METHOD FOR PRESENTATION OF IMAGES

(75) Inventor: Oliver Schreck, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 684 days.

(21) Appl. No.: 10/102,378

(22) Filed: Mar. 20, 2002

(65) Prior Publication Data

US 2002/0141629 A1    Oct. 3, 2002

(30) Foreign Application Priority Data

Mar. 29, 2001    (DE)    ............... 101 15 425

(51) Int. Cl.
   *G06K 9/00*    (2006.01)
(52) U.S. Cl. .................................. 382/130
(58) Field of Classification Search ............... 382/130, 382/131, 132, 141, 145, 147, 149, 128
   See application file for complete search history.

(56) References Cited

U.S. PATENT DOCUMENTS

| | | | |
|---|---|---|---|
| 5,779,634 A | | 7/1998 | Ema et al. |
| 5,912,984 A | * | 6/1999 | Michael et al. ............. 382/149 |
| 6,115,485 A | * | 9/2000 | Dumoulin et al. .......... 382/128 |
| 6,484,047 B1 | | 11/2002 | Vilsmeier |
| 6,834,238 B1 | * | 12/2004 | Hochman ..................... 702/21 |

OTHER PUBLICATIONS

Funktionelle Bildgebung mit der Magnetresonanztomographie, Klose et al., Electromedica 67, No. 1 (1999) pp. 27-36.

\* cited by examiner

*Primary Examiner*—Jingge Wu
*Assistant Examiner*—Ashutosh Upreti
(74) *Attorney, Agent, or Firm*—Schiff Hardin LLP

(57) ABSTRACT

In a method for the presentation of images of a region that are generated in a chronological sequence the values allocated to the picture element per image are compared to one another for acquiring changes for at least one picture element that represents an identical location per image with respect to the region to be imaged, the acquired changes are set down in a change log for the picture element, a marking is allocated to the picture element dependent on the change log, and the marking is superimposed on the location of the picture element in a selected image of the region.

21 Claims, 3 Drawing Sheets

| V11 | V12 | V13 | V14 | V15 |
|-----|-----|-----|-----|-----|
| V21 | V22 | V23 | V24 | V25 |
| V31 | V32 | V33 | V34 | V35 |
| V41 | V42 | V43 | V44 | V45 |
| V51 | V52 | V53 | V54 | V55 |
—11
FIG 1
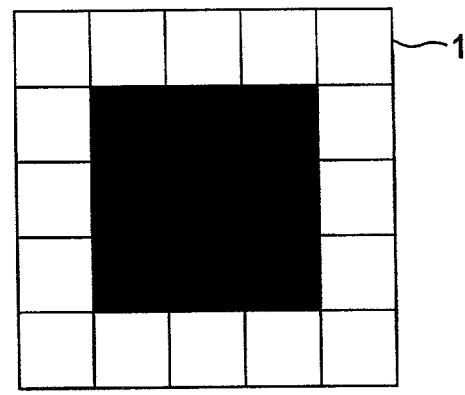
FIG 2
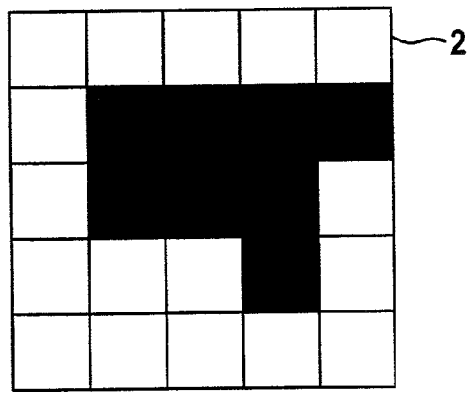
FIG 3
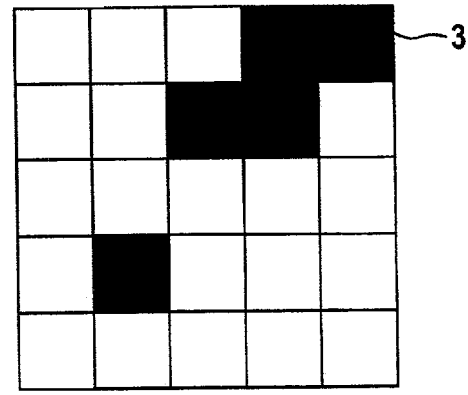
FIG 4

METHOD FOR PRESENTATION OF IMAGES

BACKGROUND OF THE INVENTION

1. Field of the Invention

The present invention is directed to a method for the presentation of images of an imaged region that are generated in a chronological succession.

2. Description of the Prior Art

In a functional magnetic resonance imaging, for example, images of a brain are registered in a chronological sequence. The objective of functional magnetic resonance imaging is to acquire a functional image for the identification of active brain areas. To that end, images with and without a specific neural activity of the brain are registered in succession at different points in time. For forming the functional image, the images generated with the neural activity are compared to those without neural activity to determine differences in order to identify active brain areas. To insure that the functional image contains reliable information, many images with and without neural activity must be registered because images are obtained on the basis of the comparatively weak BOLD (Blood Oxygen Level Dependent) effect using magnetic resonance technology and must be processed, such as by averaging, during the comparison procedure. Since even slight positional changes of the brain during an overall exposure time span of the functional magnetic resonance imaging lead to unwanted signal differences that mask the sought brain activity, the images are usually brought into the best possible coincidence before the comparison using suitable methods. Further details regarding functional magnetic resonance imaging are set forth, for example, in the article by U. Klose et al., "Funktionelle Bildgebung mit der Magnet-resonanztomographie", electromedica 67 (1999), No. 1, pages 27 through 36.

For the different purpose of monitoring a therapy for destroying a tumor, for example, medical diagnostic images of a region of a patient containing the tumor are generated between time segments of the therapy. The change in the size of the tumor can be derived from common observation of the images that are produced. How precisely and how quickly the change in size can be read from the images is highly dependent on the respective expertise and experience of a viewer, for example an attending physician.

SUMMARY OF THE INVENTION

It is an object of the present invention to provide an improved method for presenting images of a region to be imaged that are generated in a chronological sequence, with which, among other things, a simple recognition of time differences between the images is enabled.

This object is achieved in accordance with the invention in a method for the presentation of images of a region that are generated in a chronological sequence wherein respective values allocated to picture elements per image are compared to one another for acquiring changes in at least one picture element that represents an identical location per image with respect to the region to be imaged, the acquired changes are entered in a change log for the picture element, a marking is allocated to the picture element dependent on the change log, and the marking is superimposed on the location of the picture element in a selected image of the region to be imaged.

All changes that occur during the sequence thus can be presented in a single image and thus can be simply and reliably recognized. A physician supervising a tumor therapy, for example, can immediately see in what way a tumor has developed over time during the course of the therapy and how the therapy is to be subsequently continued in an appropriate way.

In an embodiment, a minimum difference between two values to be compared is presumed for one of the changes. This prevents imprecisions when generating the images from leading to an incorrect designation as change.

In another embodiment, the images are brought into coincidence before the comparison. This assures that the compared picture elements per image represent an identical location with respect to the region to be imaged. To that end, the methods cited earlier for functional magnetic resonance imaging can be applied.

DESCRIPTION OF THE DRAWINGS

FIG. 1 illustrates the matrix structure of an image of the type to be processed and presented in accordance with the inventive method.

FIGS. 2 through 4 respectively illustrate first, second and third images of a region for explaining the inventive method.

DESCRIPTION OF THE PREFERRED EMBODIMENTS

Figure 5:
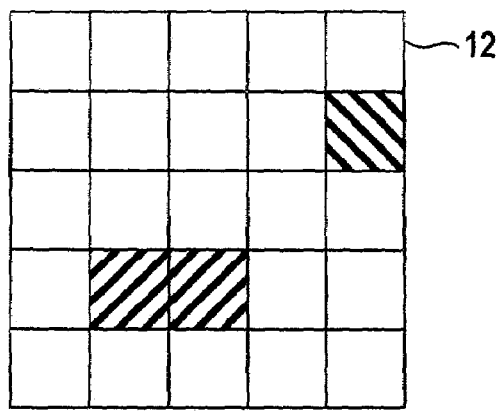
FIGS. 5 and 6 respectively illustrate first and second difference image for explaining the inventive method.

FIG. 1 shows a matrix structure 11 of a gray scale image composed of twenty-five picture elements V11 through V55. Each of the picture elements V11 through V55 can assume a value in a prescribable gray scale.

FIGS. 2 through 4 respectively show first, second and third images 1 through 3 of the same region of a subject. The images 1 through 3 have the matrix structure 11 illustrated in FIG. 1. For a simple explanation, only a two-level gray scale has been allocated to images 1 through 3, so that the picture elements V11 through V55 of the images 1 through 3 can only be black or white. The images 1 through 3 are registered in a chronological sequence, with prescribable time segments between the registration times of the individual images 1 through 3. The region to be imaged is, for example, a region of a patient having a tumor. Picture elements that image regions of the tumor in images 1 through 3 are black and the picture elements imaging the healthy tissue regions are white.

In the first image 1, the tumor extends over the picture elements V22 through V24, V32 through V34 and V42 through V44. Following the registration time of the first image 1, for example, a first segment of a radiation therapy for combating the tumor is implemented. The second image 2 is registered after the first segment of the radiation therapy. Compared to the first image 1, one can see in the second image 2 that the picture elements V42 and V43 change from black to white, i.e. the tumor has been successfully radiation-treated in these regions. In contrast thereto, the picture element V25 changes from white to black, i.e. the tumor has expanded in this region.

Following the registration time of the second image 2, a further segment of the radiation therapy is implemented. The third image 3 is registered following thereupon. Given a comparison of the third image 3 to the images 1 and 2, the following changes can be found. The picture element V42 changing from black to white from image 1 to image 2 again changes from white to black from image 2 to image 3. The picture elements V22, V32 through V34 and V45 for the first time change from black to white from image 2 to image 3. The picture element V25 that changes from white to black from image 1 to image 2 changes back from black to white from image 2 to image 3. Further, the picture elements V14 and V15 of image 2 change from white to black for the first time in image 3.

Images 1 through 3 are initially combined with one another so that the preceding changes can be visualized in a single image. To that end, a first difference image 12 shown in FIG. 5 is formed between the images 1 and 2 in that the second image 2 is subtracted from the first image 1. Those picture elements wherein a change from black to white occurs from the first image 1 to the second image 2 are identified with an upwardly directed hatching having a first density. These are the picture elements V42 and V43 in the first difference image 12. Further, those picture elements wherein a change from white to black occurs from the first image 1 to the second image 2 are identified in the first difference image 12 with a downwardly directed hatching of the first density. This is the picture element V25 in the first difference image 12. Picture elements that do not change from the first image 1 to the second image 2 remain free of a marking in the first difference image 12.

Figure 6:
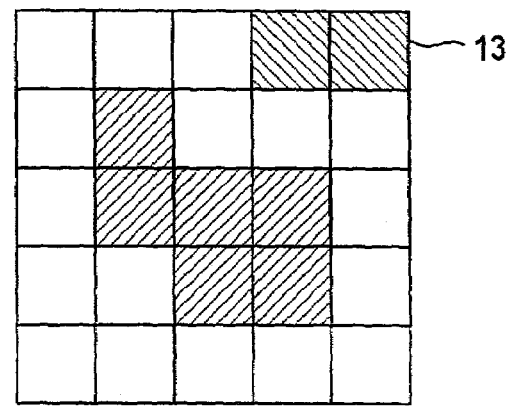

FIG. 6 shows a second difference image 13 between the first image 1 and the third image 3. Those picture elements that change from black to white from the first image 1 to the third image 3 are identified with an upwardly directed hatching having a second density. These are the picture elements V22, V32 through V34, V43 and V44 in the second difference image 13. The second density is higher than the first density. Further, those picture elements that change from white to black from the first image 1 to the third image 3 are identified with a downwardly directed hatching having the second density. In the second difference image 13, these are the picture elements V14 and V15. Picture elements that do not change from the first image 1 to the third image 3 remain free of a marking in the second difference image 13.

Figure 7:
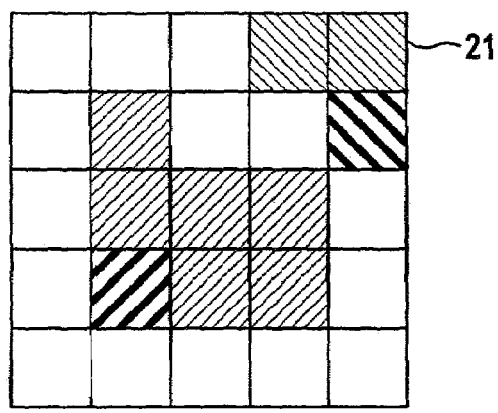
FIGS. 7 and 8 respectively illustrate first and a second gradient image for explaining the inventive method.

FIG. 7 shows a first gradient image 21 that results from a superimposition of the first and second difference images 12 and 13. The superimposition is implemented such that the marking of the second difference image is employed given the presence of a marking in the first as well as in the second difference images 12 and 13. The picture element V43 in the first gradient image 21 thus exhibits an upwardly directed hatching having the second density.

Figure 8:
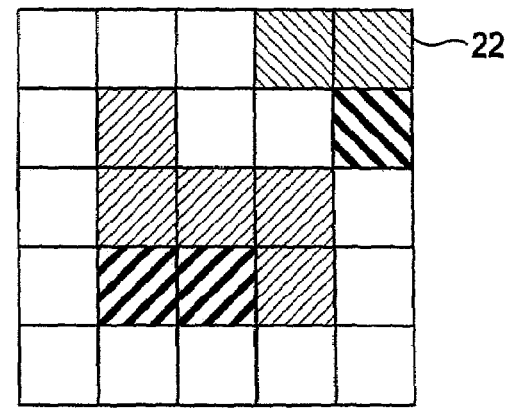

FIG. 8 shows a further gradient image 22 that results from a superimposition of the first and second difference images 12 and 13. Differing from the first gradient image 21, the markings of the first difference image 12 thereby dominate, so that the picture element V43 in the second gradient image 22 has an upwardly directed hatching of the first density.

In other embodiments, picture elements that change multiply between images comparable to the picture elements V43 are identified in the gradient image with a different hatching, for example a cross-hatching. In another embodiment, colors are employed as markings. The colors can thereby be freely selected by the user.

Figure 9:
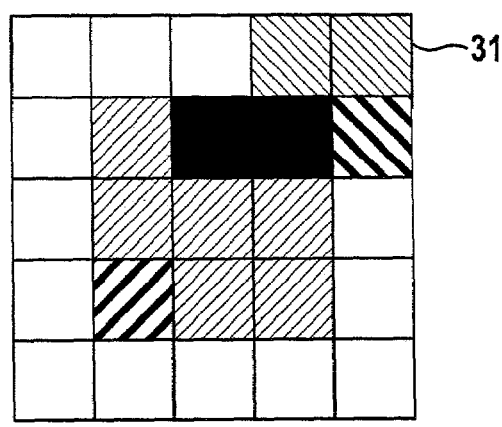
FIG. 9 illustrates a superimposed image for explaining the inventive method.

In another step, the gradient images 21 and 22 are superimposed on a selected image. FIG. 9 shows a superimposed image 31, with the first image 1 employed as the selected image as an example, the first gradient image 21 being superimposed thereon.

Figure 10:
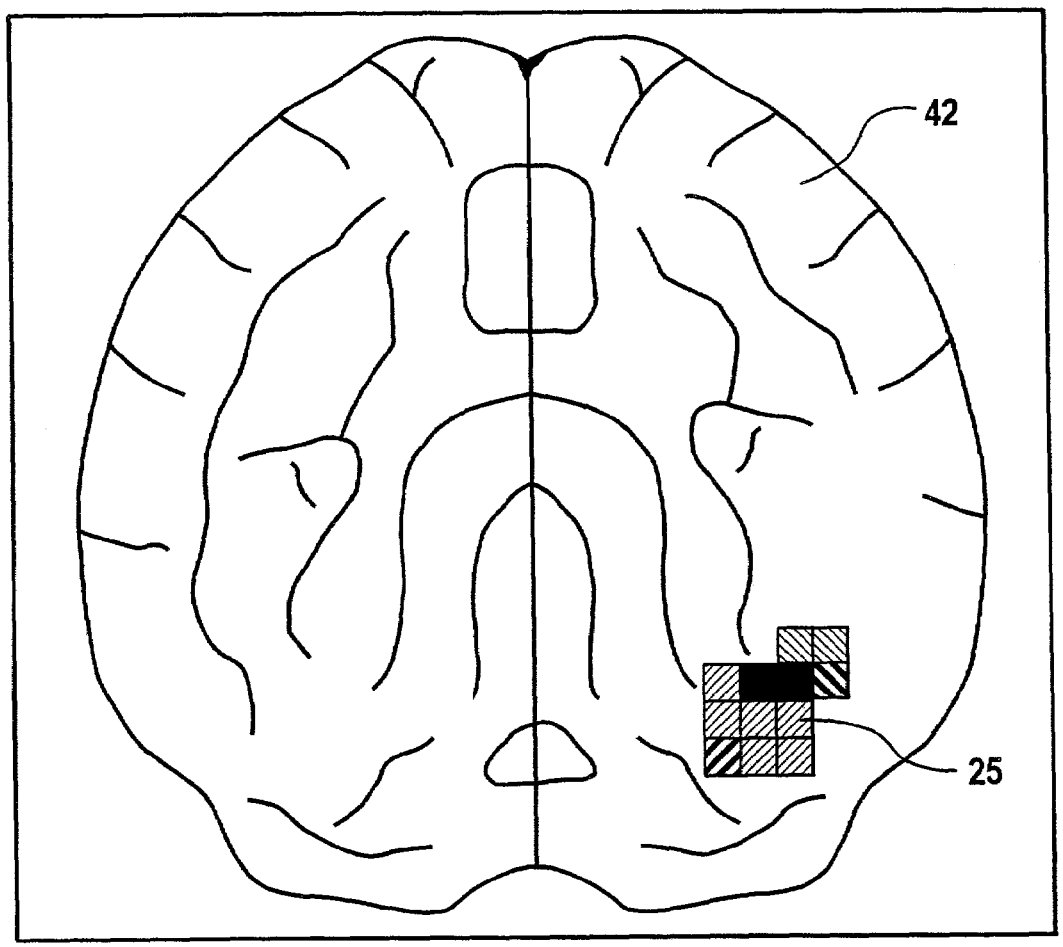
FIG. 10 illustrates an anatomical image that has a gradient image superimposed on it in accordance with the inventive method.

In another embodiment, a gradient image is superimposed on an anatomical image of the region to be imaged. The anatomical image can exhibit a higher resolution than the images employed to generate the gradient image. To that end, FIG. 10 shows an anatomical image 41 of a sagittal slice of a human brain generated with magnetic resonance technology on which a gradient image 25 is superimposed. A relationship between the anatomy and the chronological changes has thus been produced.

Not only active and inactive brain regions, but also chronological changes of brain activities can be presented in functional magnetic resonance imaging in accordance with the invention.

Although modifications and changes may be suggested by those skilled in the art, it is in the intention of the inventor to embody within the patent warranted hereon all changes and modifications as reasonably and properly come within the scope of his contribution to the art.

I claim:

1. A method for presenting images of a region of a subject obtained in a chronological sequence, each image being composed of a plurality of picture elements and each picture element having a value allocated thereto representing an appearance of that picture element in the image, comprising the steps of:
   comparing respective values allocated to respective picture elements at identical locations in two of said images to identify a change of said value between said two of said images;
   entering said change in a change log for said picture element relative to a time scale, and determining a point in time in said time scale at which said change is entered dependent on said two of said images allocating markings having different densities respectively to changes entered at different points in time in said change log;
   allocating a marking to said picture element dependent on the entry in said change log; and
   superimposing said marking at the location of said picture element in a selected image of said region.

2. A method as claimed in claim 1 comprising selecting said marking from the group consisting of colors and patterns.

3. A method as claimed in claim 1 comprising requiring a minimum difference between said respective values before designating said difference as representing a change in said picture element between said two of said images.

4. A method as claimed in claim 1 comprising, in said selected image, representing all picture elements, having respective values which exhibited no change between said two of said images, without any marking.

5. A method as claimed in claim 1 comprising allocating different markings to picture elements having respective change logs that differ.

6. A method as claimed in claim 1 comprising allocating identical markings to respective picture elements respectively having identical change logs.

7. A method as claimed in claim 1 comprising allocating markings having increasing densities respectively to changes allocated to later points in time.

8. A method as claimed in claim 1 comprising referencing said different densities relative to a first of said different points in time.

9. A method as claimed in claim 1 comprising referencing said different densities relative to a last of said different points in time.

10. A method as claimed in claim 1 comprising entering said change in said change log dependent on a directional scale determined by whether said change represents an increase or a decrease of said respective values.

11. A method as claimed in claim 10 comprising allocating different marking respectively to different directions in said change log.

12. A method as claimed in claim 11 comprising referencing said different markings to a chronologically first-occurring of said different directions.

13. A method as claimed in claim 11 comprising referencing said different markings to a chronologically last-occurring of said different directions.

14. A method as claimed in claim 1 comprising bringing said two of said images into coincidence before comparing said respective values.

15. A method as claimed in claim 1 comprising conducting said comparison by executing a mathematical calculation employing said respective values.

16. A method as claimed in claim 15 wherein said images in said sequence include a first image, and comprising successively comparing the respective values of pixels at identical locations in respective different sets of two of said images, each including said first image, by subtracting the respective values of said pixels from the value of said pixel in said first image, to obtain a plurality of difference images.

17. A method as claimed in claim 16 comprising mathematically combining said difference images with each other.

18. A method as claimed in claim 1 comprising generating said selected image with a higher resolution compared to other images in said sequence.

19. A method as claimed in claim 1 comprising employing grayscale values as said respective values for comparison.

20. A method as claimed in claim 1 comprising generating said images by magnetic resonance.

21. A method as claimed in claim 1 comprising generating said images in a functional magnetic resonance imaging sequence.

* * * * *